United States Patent
Breuer et al.

(10) Patent No.: US 10,368,221 B2
(45) Date of Patent: Jul. 30, 2019

(54) METHOD FOR OPERATING A WIRELESS COMMUNICATION DEVICE

(71) Applicant: GEMALTO M2M GMBH, Munich (DE)

(72) Inventors: Volker Breuer, Boetzow (DE); Lars Wehmeier, Falkensee (DE); Florian Denzin, Berlin (DE); André Ostheeren, Gemenos (FR)

(73) Assignee: GEMALTO M2M GMBH, Munich (DE)

( * ) Notice: Subject to any disclaimer, the term of this patent is extended or adjusted under 35 U.S.C. 154(b) by 101 days.

(21) Appl. No.: 15/570,866

(22) PCT Filed: May 10, 2016

(86) PCT No.: PCT/EP2016/060434
§ 371 (c)(1),
(2) Date: Oct. 31, 2017

(87) PCT Pub. No.: WO2016/188735
PCT Pub. Date: Dec. 1, 2016

(65) Prior Publication Data
US 2018/0139595 A1     May 17, 2018

(30) Foreign Application Priority Data
May 28, 2015   (EP) .................................... 15169669

(51) Int. Cl.
*H04W 4/70* (2018.01)
*H04W 84/04* (2009.01)

(52) U.S. Cl.
CPC ............ *H04W 4/70* (2018.02); *H04W 84/042* (2013.01)

(58) Field of Classification Search
CPC .............................. H04W 4/70; H04W 84/042
See application file for complete search history.

(56) References Cited

U.S. PATENT DOCUMENTS

2010/0057485 A1   3/2010   Luft
2014/0244568 A1*  8/2014   Goel ....................... H04W 4/08
                                                           706/52

(Continued)

FOREIGN PATENT DOCUMENTS

EP         2 843 992 A1       3/2015

OTHER PUBLICATIONS

International Search Report (PCT/ISA/210) dated Aug. 2, 2016, by the European Patent Office as the International Searching Authority for International Application No. PCT/EP2016/060434.

(Continued)

*Primary Examiner* — Melvin C Marcelo
(74) *Attorney, Agent, or Firm* — Buchanan Ingersoll & Rooney PC

(57) ABSTRACT

A method for operating a wireless communication device comprising a communication unit comprising a radio mode decision unit and a transceiver unit, the radio mode decision unit further maintaining a set of network operation modes, the wireless communication device further comprising a controlling appliance, interconnected with the communication unit by means of a command interface. The communication unit ascertains at least one communication behavior parameterization conforming to a preconfigured communication behavior demand of a cellular network1 The controlling appliance submits a transport template dataset comprising a data element relating to an envisaged communication behavior to the communication unit by means of the command interface. The radio mode decision unit determines, for an imminent data exchange session of the wireless communication device with the cellular network by means of the transceiver unit, one of said network operation modes by taking into account said communication behavior parameterization and said transport template dataset.

14 Claims, 4 Drawing Sheets

(56) References Cited

U.S. PATENT DOCUMENTS

2014/0244710 A1* 8/2014 Sharma .................. H04L 67/12
709/201
2015/0117347 A1 4/2015 Iwai
2016/0245538 A1* 8/2016 Amer .................. H04L 12/2818

OTHER PUBLICATIONS

Written Opinion (PCT/ISA/237) dated Aug. 2, 2016, by the European Patent Office as the International Searching Authority for International Application No. PCT/EP2016/060434.
Alcatel-Lucent, "M2M Communication", 3GPP Draft; R1-082813 M2M, $3^{rd}$ Generation Partnership Project (3GPP), Mobile Competence Centre; 650, Route Des Lucioles; F-06921 Sophia-Antipolis Cedex; France, Aug. 12, 2008, 7 pages.

* cited by examiner

METHOD FOR OPERATING A WIRELESS COMMUNICATION DEVICE

FIELD OF THE INVENTION

The present invention relates to a method for operating a wireless communication device in a cellular network.

The invention also pertains to a wireless communication device using said method. The invention further relates to a cellular network using said method.

BACKGROUND OF THE INVENTION

Generally, in the field of wireless communication it is known that the cellular network operators in order to secure stability of the cellular network and to keep maintenance costs low take measures to influence the behavior of wireless communication devices operating within the cellular networks. This in particular applies to wireless communication devices which are situated in the machine-to-machine domain.

One example for such influencing measures is documented in the GSMA network efficiency guide (GSMA Association, Official Document CLP.03: IoT Device Connection Efficiency Guidelines V1.0, Oct. 13, 2014), which is incorporated herein by reference.

For machine-to-machine wireless communication devices—preferably composed of a controlling appliance and a communication unit, in particular a wireless module—those measures make additional efforts necessary in order to cope with the communication behavior demands provided by the cellular network operators. This creates additional interaction efforts between the controlling appliance and the communication unit.

In present solutions the communication unit is completely controlled by the controlling appliance, while the communication units firmware directly carries out commands received via the remote control linked to the command interface with the controlling appliance. Hence the additional efforts would necessarily be put on the controlling appliance for assuring a behavior of the wireless communication device complying with the provided communication behavior demands of the cellular network.

This approach to cope with the communication behavior demands is disadvantageous as the controlling appliances are generally devices created for a special purpose according to the vertical market of the device manufacturer. Such a vertical market may be a point-of-sale, asset-tracking or an entertainment and security unit in a car. Typically such devices just request from the communication unit connectivity and aim to do nothing more than setup a connection, send or receive data and close the connection. It would be a tremendous overload to additionally handle the communication behavior demands in the controlling appliance.

On the other hand the controlling appliance still has its own demands and thus a need to control the communication link with respect to specific requirements in terms of QoS, power consumption, data throughput etc.

It is therefore the goal of present invention to overcome the mentioned disadvantages and to propose a solution for an improved control of the wireless communication device in order to comply with communication behavior demands from the cellular network the wireless communication device is currently operating with.

Further alternative and advantageous solutions would, accordingly, be desirable in the art.

SUMMARY OF THE INVENTION

For this it is according to a first aspect of the invention suggested a method to operate a wireless communication device according to claim 1. It is further suggested according to a second aspect of the invention a wireless communication device according to claim 10. It is further proposed according to a third aspect of the invention a cellular network according to claim 16.

It is according to the first aspect of the invention proposed a method or operating a wireless communication device in a cellular network, the wireless communication device comprising a communication unit comprising a radio mode decision unit and a transceiver unit, the radio mode decision unit further maintaining a set of network operation modes, the wireless communication device further comprising a controlling appliance, interconnected with the communication unit by means of a command interface, the method comprising the steps of, for the communication unit:

ascertaining at least one communication behavior parameterization conforming to a preconfigured communication behavior demand of the cellular network, for the controlling appliance submitting a transport template dataset comprising at least one data element relating to an envisaged communication behavior to the communication unit by means of the command interface for the radio mode decision unit:

determining for an imminent data exchange session of the wireless communication device with the cellular network by means of the transceiver unit, one of said network operation modes by taking into account said at least one communication behavior parameterization and said transport template dataset.

The invention is based on the commonly known architecture of cellular wireless networks according to wireless cellular technology standards like GSM, UMTS and LTE. As part of that, wireless communication devices are communicating with the cellular networks over the air interface via base stations of the cellular networks, resp. NodeB or eNodeB, in the following called base station without intended limitation in terms of supported technology standard. The wireless communication device is in particular camping on a base station, and as such operating in a cellular network.

Such wireless communication device is preferably rather than a handset a so-called machine-to-machine (M2M) device like a vending machine, an asset tracker, an electronic meter or a home security system.

Such wireless communication device comprises at least a communication unit, and preferably a controlling appliance. The controlling appliance is in particular the general controlling instance which controls the communication unit in order to achieve connectivity, e.g. with a remote server. The controlling appliance preferably fulfills more tasks concerning the general purpose of the wireless communication device, e.g. measuring data, selling goods, tracking assets etc.

The communication unit is composed at least of a transceiver unit and a radio mode decision unit. The radio mode decision unit is in particular part of or attached to the general operating firmware of the communication unit, in the following the communication unit firmware.

The transceiver unit comprises all necessary components in order to transmit or receive signals from/to a base station of the cellular network where the wireless communication device is currently operating in. Such components typically include a baseband chip, a radio frequency (RF) unit, an antenna and a protocol stack.

The radio mode decision unit is preferably connected or combined with the communication unit firmware as a software module resp. library or a separate processing unit. It is even advantageous to have both units run on separate CPUs as part of the communication unit. Part of the radio mode decision unit's tasks is to take decisions in terms of usage and behavior of the transceiver unit, in particular the RF unit, preferably in conjunction with the air interlace towards cellular network components. This includes determining of a network operation mode.

The radio mode decision unit maintains a set of network operation modes. This is preferably done by storing a couple of datasets in a memory unit of the communication unit. Such network operation modes provide a collection of configuration criteria for operating with the cellular network, where each network operation mode represents a typical operation scenario.

The stored set of network operation modes in particular each represent one out of the group of
- normal mode, wherein the wireless communication device considering general 3GPP specifications,
- network friendly mode, considering expectations from the cellular network,
- radio policy manager mode considering rules from the policy manager provided by the cellular network,
- MTC mode wherein the wireless communication device is considering 3GPP MTC specifications,
- maximum dormant mode, wherein the wireless communication device is active only once per a predefined time period for transmission,
- non-mobility mode, wherein the wireless communication device is operating in a limited area only.

The normal mode preferably conforms to a wireless communication device operating in normal coverage (NC) mode, which means the device is not operating in enhanced coverage (EC) mode, as defined by 3GPP RAN rules. Basically the normal mode is comparable with the behavior of a mobile handset, including regular freedom to send data to and receive data from the cellular network.

The network friendly mode is focused on cellular network instructions resp. expectations, which are preferably provided through connection efficiency guidelines provided by the cellular network.

The radio policy manager mode is directed to instructions from a software module provided from the cellular network to the communication unit of the wireless communication device. Radio policy managers have the task to prevent wireless communication devices from executing aggressive network accesses which endanger stability of the cellular network, e.g. massive retries when a signaling request was rejected.

The maximum dormant mode refers to wireless communication device with strong requirements in terms of power saving. In order to do so, the aim is to reduce transmit and/or receive operations to a minimum. The cellular network on the other hand in particular needs to be aware of that mode. Otherwise—should the wireless communication device not comply with the expected behavior in normal mode—the wireless communication device is in the worst case after a while handled as if it was switched off.

The non-mobility mode in particular conforms to a wireless communicating device categorized as static. This includes the ability to conduct limited or reduced measurement and signaling behavior, in particular related to mobility management, that is neighbor cell measurements etc. This leads to reduced power consumptions.

Each stored network operation mode provides at least an identifier, characterizing criteria for later selection as part of the determination and—at least optionally—details for the communication unit firmware and/or the transceiver how to operate in the cellular network.

Hence one task of the radio mode decision unit is to determine an appropriate network operation mode in particular based on the needs of the wireless communication device and/or the cellular network.

For that the inventive method is designed that way, that the communication unit ascertains at least one communication behavior parameterization. Such communication behavior parameterization conforms to a preconfigured communication behavior demand of the cellular network.

In a first preferred embodiment the step of ascertaining is conducted by transmission of at least a communication behavior parameterization message from the cellular network to the wireless communication device, in particular the communication unit. Such communication behavior parameterization message comprises information which relate to the communication behavior demand towards the wireless communication device.

In a second embodiment such a communication behavior parameterization message is provided to the radio mode decision unit by means of a subscriber identity module (SIM), which is generally connected to a wireless communication device resp. the communication unit.

The subscriber identity module is in particular provided in the form of a Universal Integrated Circuit Card (UICC).

Although it is physically part of the wireless communication device and provides interfaces for the wireless communication device to access data stored on the SIM, it belongs to the domain of the cellular network. The cellular network operator typically configures the subscriber identity modules with network specific information, in particular including communication behavior parameterization, and hands it out with each new subscription.

Further the cellular network has remote access to the subscriber identity module via the air interface, in particular by using the bearer independent protocol (BIP). For the wireless communication device such signaling—although physically carried out through the transceiver unit—is fully transparent. In addition to that as part of remote provisioning methods the subscriber identity module may further receive messages from the cellular network concerning communication behavior parameterization.

In a third embodiment such a communication behavior parameterization is ascertained by the communication unit, in particular the radio mode decision unit, by means of a software module provided by the cellular network operator. Such a software module is in particular a connection manager or said radio policy manager.

As part of such radio policy manager it is in particular foreseen to provide initiatively or on request at least one communication behavior parameterization to the communication unit. Such communication behavior parameterization is in particular part of the software module, or the software module is configured to request additional communication behavior parameterization data from the cellular network.

In particular a combination of these embodiments is available for the communication unit in order to ascertain at least one communication behavior parameterization conforming to a preconfigured communication behavior demand of the cellular network.

The step of ascertaining said at least one communication behavior parameterization is preferably executed once as part of an initialization step.

In a further advantageous embodiment it is proposed to refresh the parameterization in preparation of an imminent data exchange session.

Effectively the communication unit is then in the position to figure out, what kind of communication behavior demand the cellular network pursues.

Hence, in a next step for an imminent data exchange session the radio mode decision unit determines a network operation mode. The imminent data exchange session either comprises a data transmission, in particular to a remote server reachable through the cellular network, or a data reception or a combination of both. It is in particular a scheduled data exchange session. This is typical for wireless communication devices in the form of electricity meters who regularly at a certain time of the day send measured consumption data to a collecting server.

Alternatively or additionally the imminent data transmission is simply the next data transmission, even when the radio mode decision unit is not aware of when the next data transmission happens.

Further the determined network operation mode is preferably also valid for more than one data exchange sessions, in particular successive ones starting with the next data exchange session.

Now the radio mode decision unit determines based on said at least one communication behavior parameterization an appropriate network operation mode out of the maintained set of network operation modes. The communication behavior parameterization is for this step accessible for the radio mode decision unit as part of the communication unit. It is in particular stored in combination with the network operation modes.

The step of determination of a network operation mode comprises in particular a matching of criteria with the communication behavior parameterization.

In particular the network operation mode is selected in dependency of communication behavior parameterization elements which are mandatory, compared to recommended or preferred elements.

Preferably the radio mode decision unit filters out from the stored network operation modes those not complying with mandatory communication behavior parameterization elements. Under the remaining network operation modes that one is selected which has the best matches to the not mandatory communication behavior parameterization elements. The best matches may comprise a simple number of matching elements. In a more elaborate embodiment each communication behavior parameterization element has a value in terms of priority assigned. That leads to a weighted determination of the best matching network operation mode.

Eventually, the communication unit accepts the network operation mode determined by the radio mode decision unit. Thus it carries out the imminent data exchange session by applying the determined network operation mode on the data connection with the cellular network, resp. the active base station, and/or the way of transmitting and/or receiving data at the wireless communication device.

The available network operation modes preferably represent a set of configuration criteria which form together typical proven operation scenarios. The proposed inventive method is advantageous with respect to a wireless communication device operating in a cellular network as it is able to apply an appropriate network operation mode in response to communication behavior parameterization originated from the cellular network, without a transmission of each detailed configuration criteria for operating with the cellular network. Further the controlling appliance does not have to care about the communication behaviour parameterization from the cellular network and is hence relieved of any additional efforts.

As part of the invention it is further that the wireless communication device further comprises a controlling appliance, interconnected with the communication unit by means of a command interface. The controlling appliance is configured to submit a transport template dataset comprising at least one data element relating to an envisaged communication behavior to the communication unit by means of the command interface. For the step of determining a network operation mode, the radio mode decision unit additionally takes into account said transport template dataset.

With this inventive step the communication unit receives additionally to the communication behavior parameterization conforming to a preconfigured communication behavior demand of the cellular network, a transport template dataset from the controlling appliance.

Hence, the radio mode decision unit takes into account for determining a network operation mode both said transport template dataset and said at least one communication behavior parameterization.

For doing so the radio mode decision unit has to find an appropriate network operation mode which both fulfills the behavior demands from the controlling appliance and the cellular network.

The transport template dataset comprises or represents a collection of data relating to an envisaged communication behavior of the communication unit. In particular, the transport the transport template dataset comprises at least one out of the group of:
 envisaged periodicity of data transmissions,
 envisaged amount of data per data transmission session,
 expected data throughput per data transmissions session,
 expected quality of service of the data transmission,
 expected radio access network,
 indication of accepted power consumption,
 acceptable delay of data transmission,
 required accessibility for mobile terminated communication
 envisaged time for the data transmission
 information related to expected mobile originated and/or mobile terminated data transmission.

Typically a transport template is formed as a collection of data elements. Typical forms of transport templates are key-value pairs or provided in known exchange formats like XML, JSON, YAML etc.

As part of the suggested content of the transport template the periodicity of data transmissions depicts how often the controlling appliance is supposed to send data. This refers in particular to wireless communication devices like electricity meters or other measuring devices which regularly transmit its measurements to a remote server. The network operation mode needs to comply with this way of operating.

This also applies to the amount of data for transfer, as far as can be foreseen. If a certain amount of data is supposed to be transmitted the expected data throughput needed, in particular the maximum throughput, needs to be configured. This in particular applies to time critical data transmissions or receptions. Such a requirement may mean that a download of an update package must not take longer than the time between to transmissions.

As part of quality of service (QoS) parameters like guaranteed bit rate (GBR), maximum guaranteed bit rate (MBR), traffic class are preferably configured. Each of these QoS parameter is in particular configured separately for uplink and downlink traffic. With respect to the preferred Radio Access Network (RAT) the preferred technology like GSM, WCDMA, LTE or other cellular and/or non cellular technologies is configured, in particular with respect to the availability.

An indication related to power consumption minimization resp. power saving indicates such constraint, in particular in terms of maximum or average power consumption per time unit.

Further the controlling appliance is foreseen to request certain network operation modes (in particular network friendly. CAT 0 EC/LC, non mobility etc. as mentioned above).

With the indication of an acceptable delay for time of transmission the controlling appliance is configured to indicate to the communication unit that non-momentary transmissions are planned, and hence if the cellular network indicates high traffic, that for a given amount of time, the data transmission or reception may be pushed to a later point in time.

With the indication in terms of reachability from outside, that is if mobile originated and/or mobile terminated traffic is supported, the communication unit is informed about envisaged transmission directions. This is in particular important with respect to sleep mode. If the controlling appliance does not expect incoming communication or would even not be configured to take such calls, the communication unit is able to select an appropriate network operation mode only concentrating on data transmissions from the controlling appliance. Further it is foreseen to indicate as part of the transport template for the suggested configurations if they are mandatory, preferred or can be ignored.

This method is further advantageous as the determination is conducted within the communication unit of the wireless communication device. This reliefs the controlling appliance from tasks related to react on cellular network originated communication behavior parameterization. It further reliefs the controlling appliance from translating its own communication behavior requirements into network operation modes and its configuration criteria details.

Hence, the controlling appliance can concentrate on its task within the wireless communication device, in particular vertical market related purpose of the controlling appliance. The connectivity via the communication unit is from the controlling appliance assumed as being available according to the connectivity requirements provided by means of the transport templates.

According to another preferred embodiment it is proposed a method further comprising the step of accessing a preconfigured remote server for requesting data elements relating to an additional network operation mode, downloading said data elements relating to said network operation mode, and adding said data elements to the radio mode decision unit.

This advantageous embodiment solves the issue, should no appropriate network operation mode for the requirements from the cellular network and/or the controlling appliance be available at the radio mode decision unit.

For that case a preconfigured remote server is addressed by the wireless communication device, in particular the communication unit, and data relating to at least one suitable network operation mode are downloaded.

In particular said request to the preconfigured remote server comprises data relating to at least one of said communication behavior parameterization and/or said transport template dataset. With that, the request is parameterized and is expected to return an appropriate network operation mode.

This is in particular advantageous when for a given mandatory communication behavior parameterization no network operation mode is available. The received data elements relating to the network operation mode are subsequently stored in the memory unit accessible for the radio mode decision unit.

Hence, the radio mode decision unit is configured to determine a suitable network operation mode taking into account cellular network's and/or controlling appliance's demands, including the previously downloaded network operation mode.

An additional optimization is foreseen for the case that as result of requesting the preconfigured remote server in response data elements for exactly one network operation mode are received. In that case the radio mode decision unit preferably saves additional steps and determines for the imminent data exchange session the just downloaded network operation mode.

In another advantageous embodiment it is suggested a method wherein the communication behavior parameterization comprises a plurality of network operation modes indicated by the cellular network and said step of determining one network operation mode comprises a selection out of said plurality of network operation modes.

As part of this embodiment the communication behavior parameterization originated from the cellular network comprises a couple of network operation modes. The radio mode decision unit then—as part of the determination step— conducts a selection out of the provided network operation modes.

This embodiment is advantageous as it guarantees from the side of the cellular network, that a network operation mode is selected that suits the cellular networks needs.

On the other hand for the wireless communication device it is advantageous as it has options for the way of operating within the cellular networks according to the controlling appliance needs, instead of having to obey to instructions from the cellular networks which do not match its needs.

According to another preferred embodiment it is proposed a method further comprising after the step of determining, the step of providing the controlling appliance with an indication of the determined network operation mode.

With that preferred embodiment the controlling appliance receives an indication about how the communication unit is about to handle the imminent data transmission session, in particular when it is a data transmission, e.g. of a measurement of a metering device.

Provided that the network operation mode indicates a delay of data transmissions, in particular due to a selected maximum dormant mode, the controlling appliance has the knowledge, that the requested data transmission will not be executed immediately, but within a certain timeframe. Preferably as part of the network operation mode, or accompanying this indication the controlling appliance further receives an indication in what maximum time period the data transmission will happen.

It is moreover advantageous to keep in the case of non-momentary data transmission the controlling appliance informed, e.g. via an acknowledgement, about whether and/or when the data transmission was successfully executed.

Should the communication unit find out that the imminent transmission is not able to be carried out with the current communication behavior demands of the cellular network, or at least the transmission is not able to be carried out complying with the demands from the controlling appliance, the communication unit resp. the radio mode decision unit provides a message to the controlling appliance. This in particular applies to the situation of a back-off timer event, where the cellular network sends to the wireless communication device in case of cellular network resp. cell congestion the information about delaying transmission for a given back-off time period.

The controlling appliance then decides about abortion of the transmission or about easing the demands of the previously provided traffic template. This is in particular done by providing another traffic template from the controlling appliance to the communication unit, in particular comprising only delta values compared to the previously provided traffic template. As only the controlling appliance knows about the urgency and character of the imminent transmission, the radio mode decision unit is not able to decide about abortion or transmission not complying with the traffic template.

In another preferred embodiment it is proposed a method comprising after the step of determining, the step of transmitting to the cellular network an indication of the determined network operation mode.

With that embodiment the cellular network is informed about the network operation mode, the communication unit is about to use for the next one or more data exchange sessions. Hence the cellular network is informed about the expected behavior of the wireless communication device.

This is in particular useful for the cellular network in case it supports features like traffic classes and/or a handling of network friendly devices. Depending upon the information received from the communication unit, the cellular network is put in the position to assign such traffic classes, in particular that this is a network friendly device or an aggressive device. This is advantageous for the cellular network to decide about priority within the cellular network or cell of the traffic induced by this wireless communication device. Also tariff related issues are taken into account, that is whether a high priority tariff or a basic MTC tariff is selected for the subscription of the wireless communication device.

This is in particular advantageous in conjunction with another preferred embodiment wherein in response to said indication the cellular network transmits at least one control information message relevant for executing the data exchange session.

According to that embodiment the cellular network provides to the wireless communication device in a message such control information for how to behave within the cellular network during the envisaged data exchange session. This is in particular advantageous when the network operation modes, in particular when provided by the cellular network as part of the transmission of communication behavior parameterization, does mainly comprise criteria for selection but no details for how to operate in the cellular network.

Hence the cellular network provides in this step details about how to operate, e.g. a DRX cycle, fitting to the selected network operation mode, in case of a static device network operation mode.

The network operation mode in this embodiment is configured to comprise meta-information regarding the way of operating in the cellular network, while after the indication of the selected network operation mode the cellular networks provides the configuration details for doing so.

Preferably the communication unit stores the received details after the request and thus avoids to repeatedly requesting the same details for later data transmission.

With this embodiment, the network operation modes are able to be provided in a slim manner, avoiding an overhead of information. Further it is fully transparent for the controlling appliance what the communication unit and the cellular network are negotiating in order to fulfill—amongst others—its operating preconditions provided by the transport template.

According to the second aspect of the invention it is proposed a wireless communication device configured for operating in a cellular network, the wireless communication device comprising a communication unit comprising a radio mode decision unit and a transceiver unit, the radio mode decision unit further maintaining a set of network operation modes, the wireless communication device further comprising a controlling appliance interconnected with the communication unit by means of a command interface, wherein the communication unit is configured to:
  ascertain at least one communication behavior parameterization conforming to a preconfigured communication behavior demand of the cellular network, the controlling appliance is configured to submit a transport template dataset comprising at least one data element relating to an envisaged communication behavior to the communication unit by means of the command interface, and wherein the radio mode decision unit is configured to:
  determine for an imminent data exchange session of the wireless communication device with the cellular network by means of the transceiver unit, one of said network operation modes taking into account said at least one communication behavior parameterization and said transport template dataset.

This aspect relates to a wireless communication device implementing the inventive method of the first aspect.

The second aspect shares the advantages of the first aspect.

According to the third aspect of the invention it is proposed a cellular network configured for operating at least one wireless communication device according to the second aspect, the cellular network comprising a plurality of base stations configured for executing transmit and receive operations with said wireless communication device,
  wherein the cellular network is configured to provide as communication behavior parameterization to the wireless communication device for an envisaged data exchange session a plurality of network operation modes, to receive an indication of the determined network operation mode from the wireless communication device,
  in response to transmit to the wireless communication device at least one control information message relevant for executing the envisaged data exchange session.

The cellular network is a wireless network supporting one or more of the wireless cellular technology standards 2G, 3G, or 4G and its technologies like GSM, GPRS, EDGE, UMTS, (W)CDMA, HSPA and/or LTE. It comprises a couple of base stations, respectively nodeBs or eNodeBs, which form the interface for wireless communication devices to the air interface. When a wireless communication device is operating with the cellular network, it camps in detail on a base station, which is called the active base station. The cellular network is configured to support the wireless communication in its task to determine a network operation mode. This support comprises the two tasks first to provide as communication behavior parameterization a plurality of network operation modes.

When the cellular network receives an indication about which network operation mode is determined by the wireless communication device, the cellular network provides a control information message, which comprises elements allowing the communication unit to adapt its behavior within the cellular network according to the determined network operation mode.

The third aspect shares the advantages of the first and second aspect.

As it is shown this invention advantageously solves the depicted problem by determining a suitable network operation mode in particular independently from interactions from the controlling appliance of the wireless communication device. Thus the wireless communication device is able to fulfill the demands both from the cellular network and the controlling appliance, without additional efforts on the side of the controlling appliance.

BRIEF DESCRIPTION OF THE DRAWINGS

The following description and the annexed drawings set forth in detail certain illustrative aspects and are indicative of a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a wireless communication device 1 of the type to which the present invention is applied as an embodiment. It comprises a controlling appliance 2 and a communication unit 3. Both units are interconnected by at least a command interface 7. This is preferably an AT command interface. Alternatively or additionally it is foreseen a functional call interface, e.g. via Java, for accessing the remote control 12 of the communication unit 3. In any case the command interface 7 allows for initiative communication from the controlling appliance to the communication unit and vice versa. In the case of an AT interface this projects to an AT command call from the controlling appliance to the communication unit, preferably with a response from the communication unit. In the opposite direction unsolicited result codes (URC) provide the initiative message flow from the communication unit to the controlling appliance. A controlling appliance may respond with another AT command.

Figure 1:
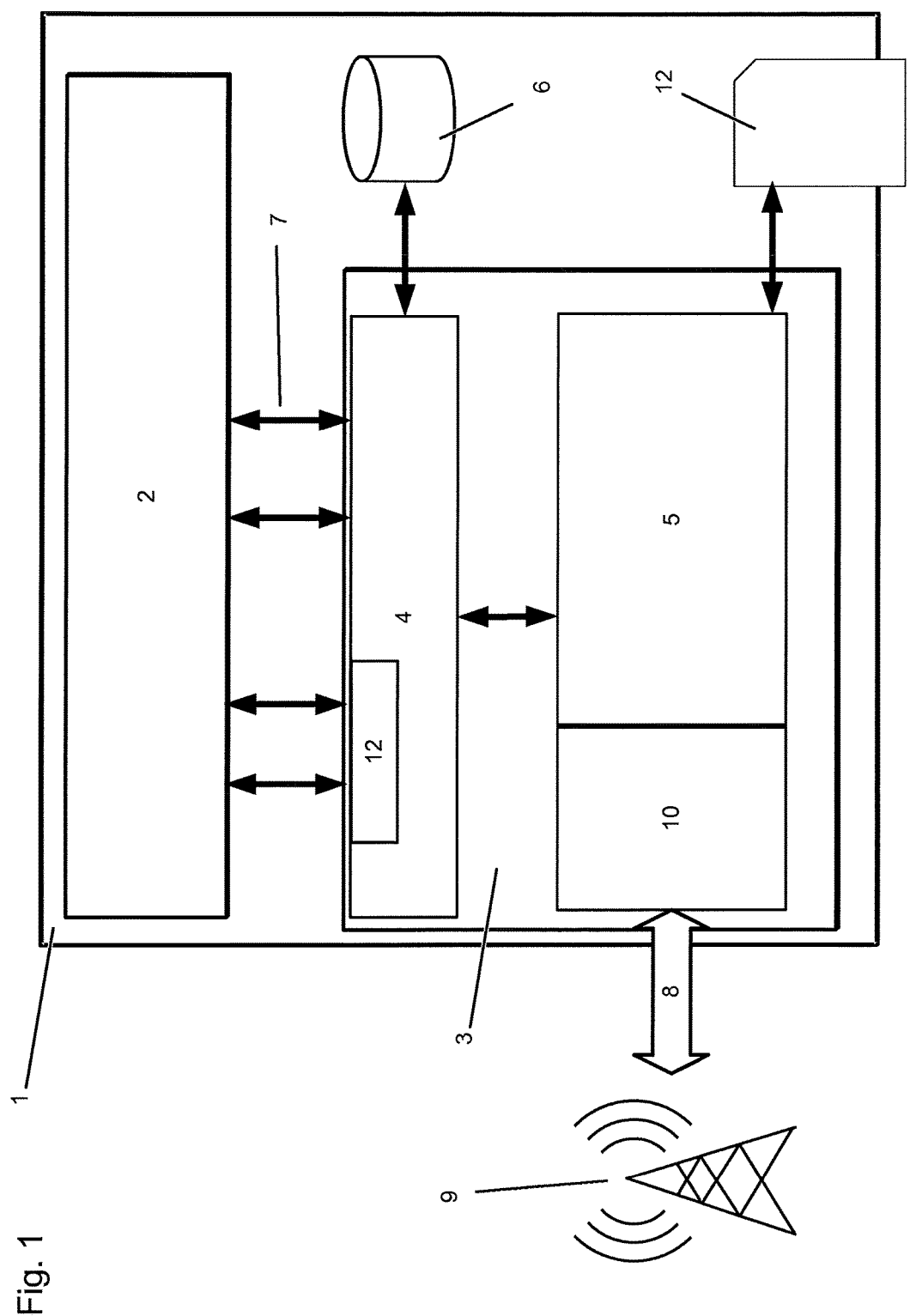
FIG. 1 represents a wireless communication device of the type to which the present invention is applied to as an embodiment.

As part of the communication unit 3 the radio mode decision unit 4 receives commands from the controlling appliance 2.

The radio mode decision unit 4 further has access to memory unit 6. In memory unit 6 are stored in particular data relating to network operation modes. For determination of an appropriate network operation mode the radio mode decision unit accesses based on demands for operation—in particular in the form of transport template datasets from the controlling appliance—the memory unit and compares the demand with stored data characterizing each stored network operation mode. The one which fits best is then picked as the active network operation mode for the next data exchange session.

Typically a data exchange session is initiated by the controlling appliance 2 with an AT command sent to the communication unit 3. The radio mode decision unit 4 then works as an intermediate layer which controls according to the picked network operation mode the communication unit firmware 5, which is directly tied to the transceiver unit 10. Via the transceiver unit and the air interface 8 the cellular network 9 is accessed, represented by the active base station, where the wireless communication device is currently camping on.

In case of a network operation mode including a delayed data transmission, the radio mode decision unit 4 instructs the communication unit firmware 5 to conduct the imminent data transmission at a later point in time.

Additionally the radio mode decision unit 4 informs over the command interface 7 the controlling appliance about the delay resp. the selected network operation mode, and in particular when the data transmission is actually successfully carried out—or has failed.

The radio mode decision unit 4 is further configured to receive communication behavior demands, that is demands from the cellular network 9 regarding the communication behavior of the wireless communication device 1. In particular such communication behavior demands are transmitted as part of a data transmission of communication behavior parameterization to the communication unit resp. to the subscriber identification module 11. In the latter case in particular data transmission bearer means are used that are transparent to the communication unit, like bearer independent protocol (BIP).

Figure 2:
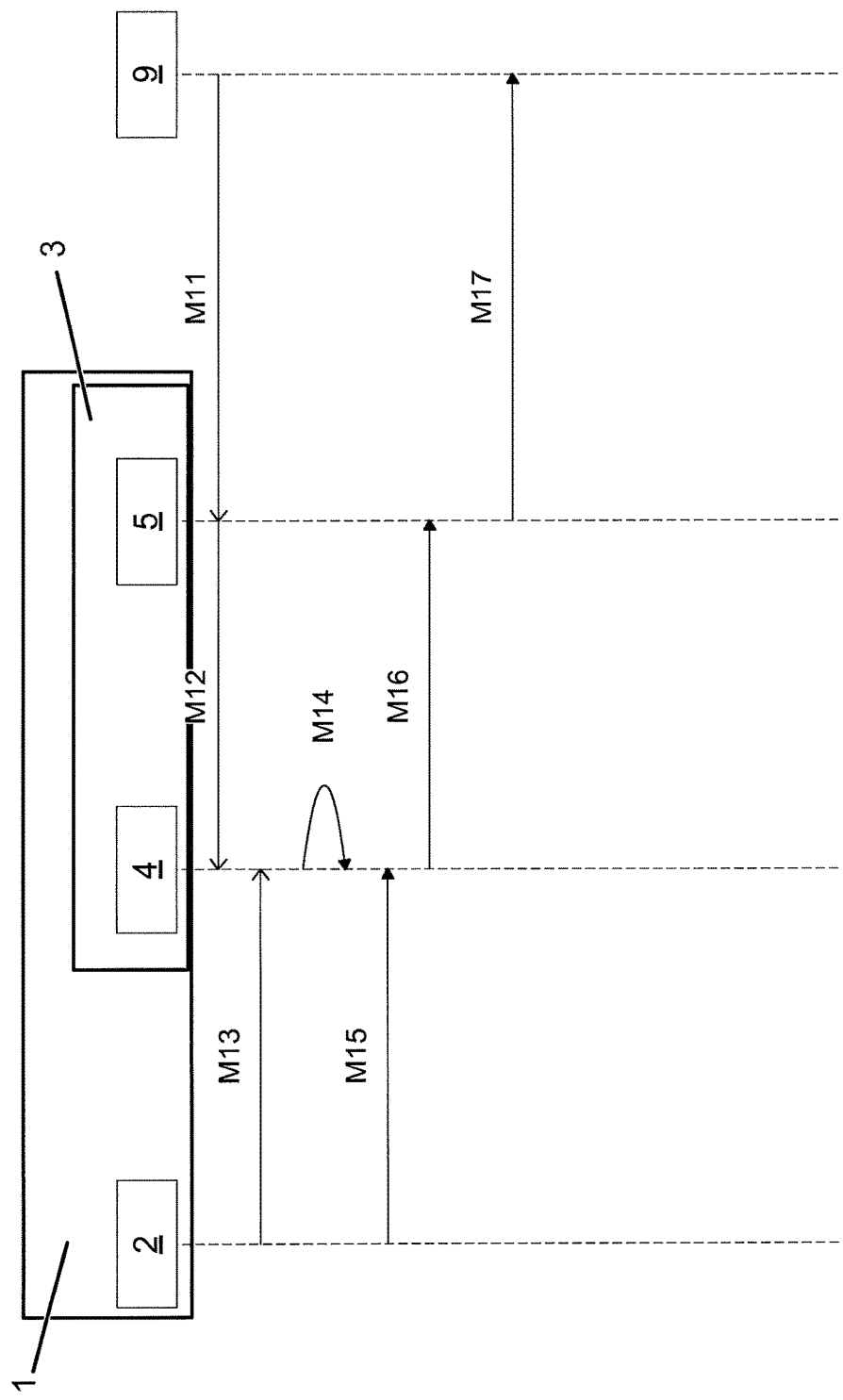
FIG. 2 shows a first sequence diagram of an embodiment of present invention.

FIG. 2 shows a sequence diagram of a basic exemplifying message flow between the entities according to a preferred embodiment of the invention. Involved in this message flow are the controlling appliance 2, the communication unit 3 comprising the radio mode decision unit 4 and the communication unit firmware 5, each being part of a wireless communication device 1, and the cellular network 9. It is to be understood that the shown messages do not necessarily indicate direct messages, but there may be a couple of intermediate units involved that forward the shown message. This is in particular the case for the messages between the cellular network 9 and the communication unit firmware 5, where in particular at least the active base station, the air interface 8 and a transceiver unit 10 are involved.

The message flow shown in the sequence diagram of FIG. 2 starts with a communication behavior parameterization message M11 from the cellular network to the communication unit firmware 5. The communication behavior parameterization message M11 comprises information conforming to a preconfigured communication behavior demand of the cellular network 9 towards the respective wireless communication device 1.

The communication unit firmware 5 forwards the content of the communication behavior parameterization message M11 to the radio mode decision unit 4 with message M12. At the radio mode decision unit the content of message M12 is at least held available.

With transport template dataset message M13 the controlling appliance 2 sends—in particular by virtue of an AT command—to the radio mode decision unit a transport template comprising at least one data element relating to an envisaged communication behavior of the communication unit. The transport template is in particular following a file in XML, JSON or simple key/value format. Further at the radio mode decision unit the content of message M13 is at least held available.

The two messages M11, M13 are not necessarily sent within a short timeframe and in the shown order. For the next step the information provided with the two messages merely needs to be available at the radio mode decision unit 4.

In the following the radio mode decision unit 4 determines an appropriate network operation mode at least based on the information provided from the cellular network 9 and the controlling appliance 2.

Advantageously the radio mode decision unit identifies which of the demands from the transport template of the controlling appliance and the communication behavior parameterization of the cellular network is mandatory or not. In the next step for the identified mandatory demands the available network operation modes are analyzed, if they comply with the mandatory demands.

This is in particular the case for power consumption demands from the controlling appliance. Provided it is clear, that in the normal network operation mode the power consumption demands cannot be fulfilled, at least another network operation mode with reduced power consumption needs to be available.

This is in particular the stationary mode, which is characterized by a wireless communication device which is expected not to materially move. Hence the wireless communication device is expected to stay on one base station and is in particular configured to reduce mobility management functions, that are used to identify signaling power of neighboring base stations.

Additionally the maximum dormant mode would apply to that demand. Here the wireless communication device is expected to wake up after a predefined time, in particular within hours or even days. After that period it updates—when required—the broadcasted control data from the cellular network. Finally—in particular in conjunction with an envisaged regular data transmission or reception—the wireless communication device sends signals to the cellular network, in the first place to indicate that the camping session on the active base station is still valid.

From the cellular network in this example the communication behavior parameterization indicates a demand for a reduction of signaling compared to normal mode.

As the stationary mode only provides a reduction of signaling in relationship with the mobility management, this is expected not to conform to the communication behavior parameterization from the cellular network.

But the maximum dormant mode complies with the cellular network's communication behavior demand. Hence taking into account the demands from controlling appliance and cellular network the maximum dormant mode is ready to be picked by the radio mode decision unit.

Eventually the radio mode decision unit indicates with the message M14 internally the determined network operation mode.

Following that determination step, the controlling appliance launches with message M15 a data exchange session, in particular a data transmission envisaged to be sent to a remote server by means of the cellular network 9. The message request M15 is retrieved at the radio mode decision unit. Taking into account the determined network operation mode the radio mode decision unit instructs the communication unit firmware with message M16 how to set up the data connection with the cellular network and consequently launch the data exchange session including data transmission M17 taking into account the instructions from message M16.

For the case of the maximum dormant mode, the data transmission M17 may be delayed until the next signaling window is reached.

For the cellular network and the controlling appliance said data connection and/or data transmission M17 obeys the demands provided with the messages M11 and M13.

Figure 3:
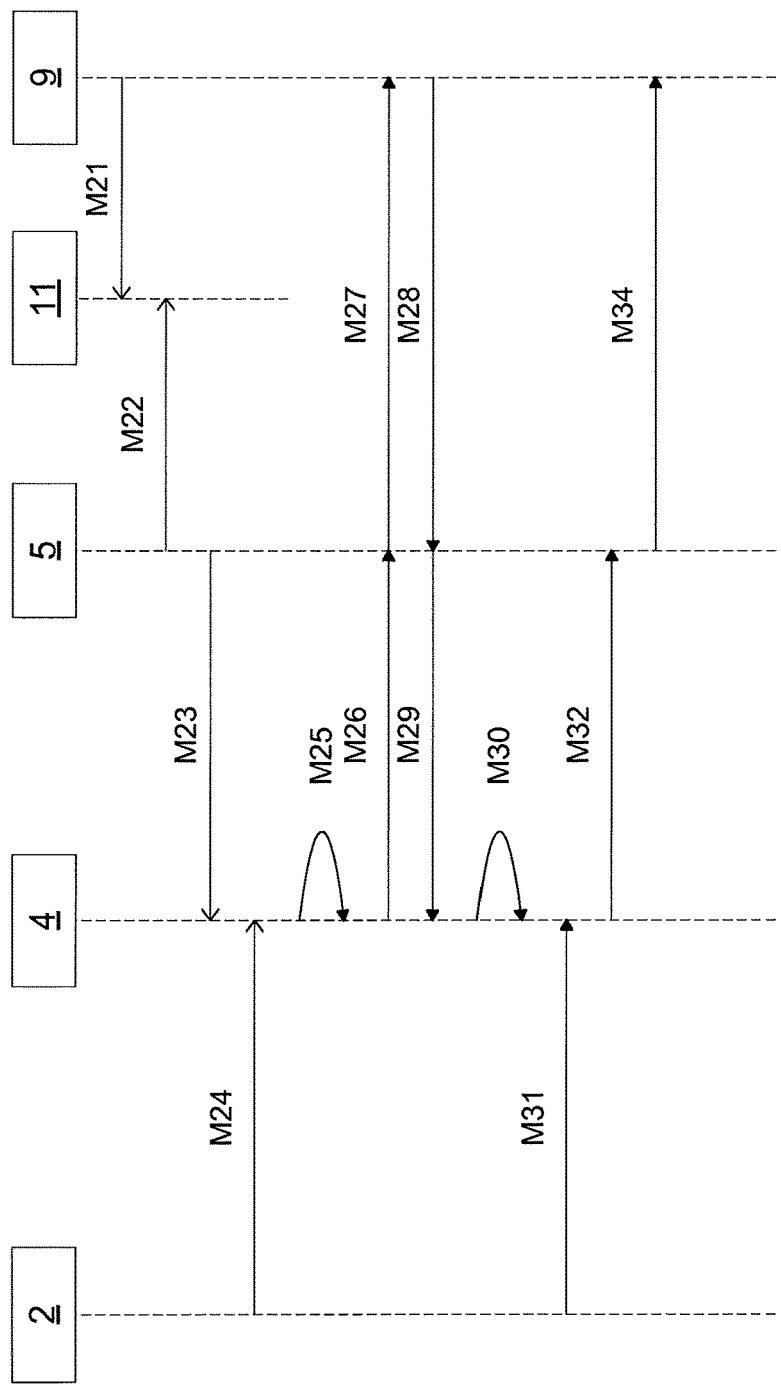
FIG. 3 represents a second sequence diagram of an embodiment of present invention.

FIG. 3 shows a sequence diagram with a similar setup according to another preferred embodiment of the inventive method.

Here additionally a subscriber identification module 11 is involved. Cellular network 9 submits in message M21 to the subscriber identification module 11 information relating to communication behavior parameterization conforming to a preconfigured communication behavior demand of the cellular network. This message M21 is in particular a BIP message from the cellular network to a subscriber identification module 11.

It is further encompassed that the cellular network configures with message M21 the subscriber identification module 11 at preconfiguration time at the premises of the cellular network operator before placing in the wireless communication device 1 resp. placing in the field.

Also message M21 is according to another preferred embodiment part of a remote provisioning resp. subscription management when the subscriber identification module is already put in the field.

In any case subscriber identification module 11 carries after reception of message M21 the data relating to at least one communication behavior parameterization. Those data are configured to be read from the communication unit, in particular the communication unit firmware 5 with message M22, and after reception of those data forwarded to the radio mode decision unit 4 with message M23.

In a further step the radio mode decision unit receives with transport template dataset M24 from the controlling appliance at least a data element relating to envisaged communication behavior of the communication unit. This complements to message M13 from FIG. 2.

Should as part of the determination of an appropriate network operation mode in preparation of message M25 it turn out that no appropriate network operation mode is available, the radio mode decision unit 4 instructs the communication unit firmware 5 to contact via the cellular network 9 a remote server for additional network operation modes.

Typically the message M27 to the remote server comprises parameter relating to the received demands provided with the messages M21 and M24. In response with message M28 data elements relating to at least one further network operation mode are retrieved at the communication unit firmware and forwarded to the radio mode decision unit with message M29.

Hence, the radio mode decision unit is capable of determining an appropriate network operation mode from the ones received from the remote server. If it is only one network operation mode provided with message M29/M28, then no additional determination step is necessary, hence the received network operation mode is picked. This determination is indicated internally with message M30 and stored for later data exchange sessions.

Conforming to steps M15-17 of FIG. 2 now steps M31-M33 show the launch of a data exchange session which gets applied the determined network operation mode.

Figure 4:
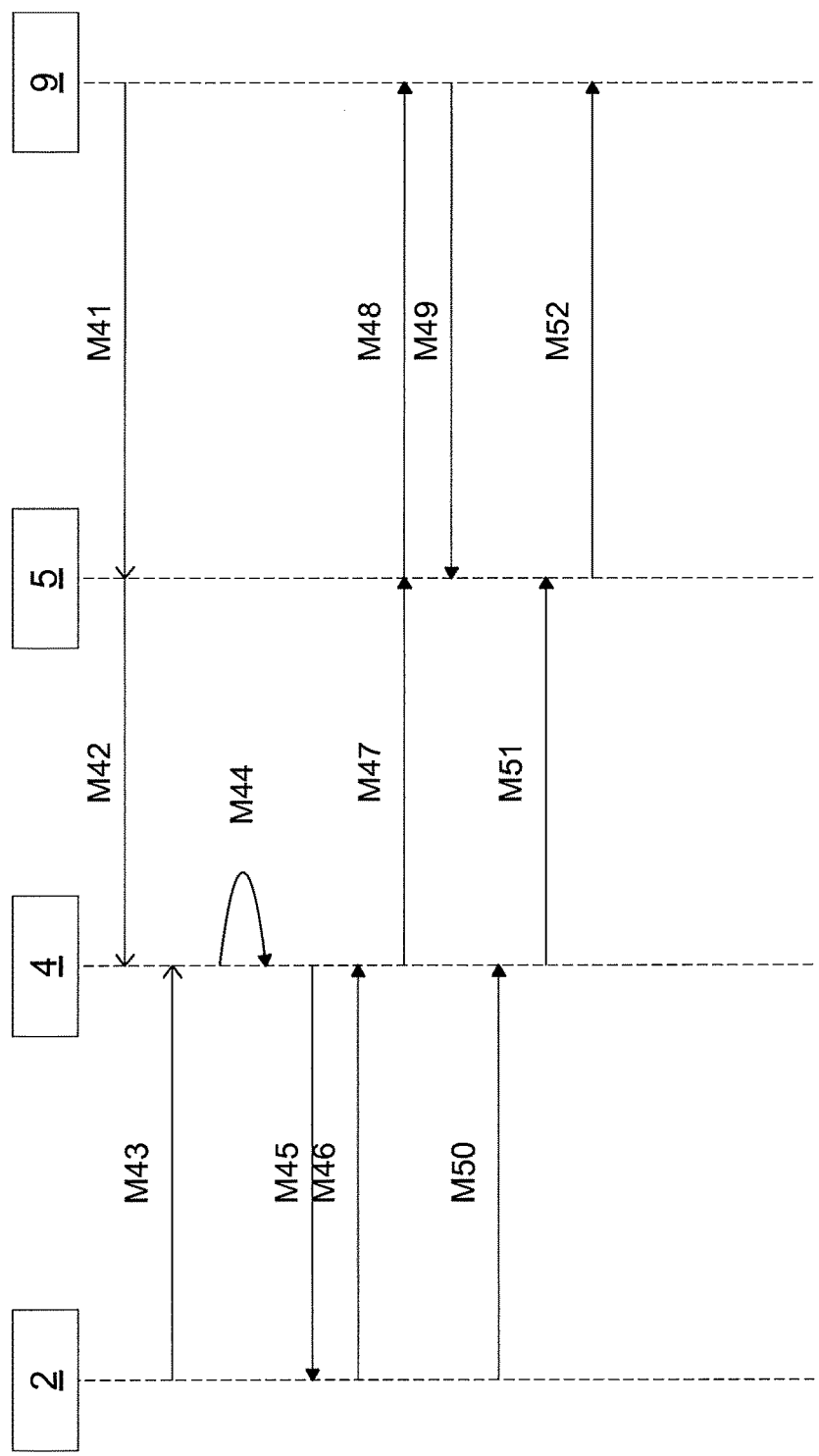
FIG. 4 shows a third sequence diagram of an embodiment of present invention.

In FIG. 4 another exemplifying embodiment of the inventive method is shown in another sequence diagram. Here the start of the method is similar to FIG. 2, wherein messages M41 to M44 conform to M11 to M14.

When the appropriate network operation mode is determined, now with message M45 the controlling appliance is informed about the selected network operation mode. In response the controlling appliance optionally confirms (here with message M46) the selection.

This step is advantageous as i.e. the controlling appliance is informed that the next data transmission session may be delayed due to the selected network operation mode. In the response message M46 hence the controlling appliance preferably provides a timeout period for the envisaged next data transmission.

Additionally with message M47 the radio mode decision unit 4 instructs the communication unit firmware 5 to send a message M48 to the cellular network 9 indicating the selected network operation mode.

For the cellular network this is important information for the next message. Here—in particular when in message M41 the cellular network provided a couple of network operation modes for use in the following—the cellular network is hence configured to provide with message M49 details for the communication unit firmware about how to behave according to the selected network operation mode. Such details relate in particular to the DRX cycle, activating dormant or power saving mode (PSM), enhanced coverage functionality, measurement event reporting, and network friendly mechanisms like back-off timer.

When now with message M50 the controlling appliance launches another data transmission session, forwarded with message M51 from the radio mode decision unit to the communication unit firmware, the communication mode firmware is in the position to apply the received details for starting the data transmission session with message M52 towards the cellular network 9.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a wireless communication device in a cellular network, the wireless communication device comprising a communication unit comprising a radio mode decision unit and a transceiver unit,
the radio mode decision unit further maintaining a set of network operation modes, the wireless communication device further comprising a controlling appliance, interconnected with the communication unit by means of a command interface,
the method comprising the steps of, for the communication unit:
ascertaining at least one communication behavior parameterization conforming to a preconfigured communication behavior demand of the cellular network, for the controlling appliance:
submitting a transport template dataset comprising at least one data element relating to an envisaged communication behavior to the communication unit by means of the command interface,
for the radio mode decision unit:
determining for an imminent data exchange session of the wireless communication device with the cellular network by means of the transceiver unit, one of said network operation modes by taking into account said at least one communication behavior parameterization and said transport template dataset.

2. Method according to claim 1, further comprising the step of accessing a preconfigured remote server for requesting data elements relating to an additional network operation mode,
downloading said data elements relating to said network operation mode, and adding said data elements to the radio mode decision unit.

3. Method according to claim 1, wherein the communication behavior parameterization comprises a plurality of network operation modes indicated by the cellular network and said step of determining one network operation mode comprises a selection out of said plurality of network operation modes.

4. Method according to claim 1, further comprising, after the step of determining, the step of providing the controlling appliance with an indication of the determined network operation mode.

5. Method according to claim 1, further comprising, after the step of determining, the step of transmitting to the cellular network an indication of the determined network operation mode.

6. Method according to claim 5, wherein in response to said indication the cellular network transmits at least one control information message relevant for executing the data exchange session.

7. Method according to claim 1, wherein the transport template dataset comprises at least one data element out of the group of:
envisaged periodicity of data transmissions,
envisaged amount of data per data transmission session,
expected data throughput per data transmissions session,
expected quality of service of the data transmission,
expected radio access network,
indication of accepted power consumption,
acceptable delay of data transmission,
required accessibility for mobile terminated communication,
envisaged time for the data transmission,
information related to expected mobile originated and/or mobile terminated data transmission.

8. Method according to claim 1, wherein the determined network operation mode is one out of the group of:
normal mode, wherein the wireless communication device considering general 3GPP specifications,
network friendly mode, considering expectations from the cellular network,
radio policy manager mode considering rules from the policy manager provided by the
cellular network, MTC mode wherein the wireless communication device is considering 3GPP MTC specifications, maximum dormant mode, wherein the wireless communication device is active only once per a predefined time period for transmission, non-mobility mode, wherein the wireless communication device is operating in a limited area only.

9. Wireless communication device configured for operating in a cellular network, the wireless communication device comprising a communication unit comprising a radio mode decision unit and a transceiver unit, the radio mode decision unit further maintaining a set of network operation modes, the wireless communication device further comprising a controlling appliance interconnected with the communication unit by means of a command interface, wherein the communication unit is configured to:
ascertain at least one communication behavior parameterization conforming to a preconfigured communication behavior demand of the cellular network, the controlling appliance is configured to submit a transport template dataset comprising at least one data element relating to an envisaged communication behavior to the communication unit by means of the command interface, and wherein the radio mode decision unit is configured to:
determine for an imminent data exchange session of the wireless communication device with the cellular network by means of the transceiver unit, one of said network operation modes taking into account said at least one communication behavior parameterization and said transport template dataset.

10. Wireless communication device according to claim 9, further configured to access a preconfigured remote server for requesting data elements relating to an additional network operation mode, to download said data elements relating to said network operation mode, and to add said data elements to the radio mode decision unit.

11. Wireless communication device according to claim 9, wherein the communication behavior parameterization comprises a plurality of network operation modes indicated by the cellular network and
wherein the radio mode decision unit is configured for determining said network operation mode to select one out of said plurality of network operation modes.

12. Wireless communication device according to claim 9, wherein the communication unit is further configured after the determining said network operation mode, to provide the controlling appliance with an indication of the determined network operation mode.

13. Wireless communication device according to claim 9, wherein the communication unit is further configured after the determining said network operation mode, to transmit to the cellular network an indication of the determined network operation mode.

14. Cellular network configured for operating at least one wireless communication device according to claim 9, the cellular network comprising a plurality of base stations configured for executing transmit and receive operations with said wireless communication device,
wherein the cellular network is configured to provide as communication behavior parameterization to the wireless communication device for an envisaged data exchange session a plurality of network operation modes,
to receive an indication of the determined network operation mode from the wireless communication device,
in response to transmit to the wireless communication device at least one control information message relevant for executing the envisaged data exchange session.

* * * * *